United States Patent
Lance (10) Patent No.: US 6,471,296 B2
(45) Date of Patent: Oct. 29, 2002

(54) ADJUSTABLE HEADREST

(75) Inventor: Mark Andrew Lance, Williamstown (AU)

(73) Assignee: Henderson's Industries Pty Ltd., Victoria (AU)

(*) Notice: Subject to any disclaimer, the term of this patent is extended or adjusted under 35 U.S.C. 154(b) by 0 days.

(21) Appl. No.: 09/772,913

(22) Filed: Jan. 31, 2001

(65) Prior Publication Data

US 2001/0028191 A1 Oct. 11, 2001

Related U.S. Application Data (63) Continuation of application No. PCT/AU99/00624, filed on Jul. 30, 1999.

(30) Foreign Application Priority Data

Jul. 31, 1998 (AU) .............................................. PP 4964

(51) Int. Cl.$^7$ ................................................. A47C 7/36
(52) U.S. Cl. ..................................................... 297/410
(58) Field of Search ................................ 297/391, 410

(56) References Cited

U.S. PATENT DOCUMENTS

| | | | |
|---|---|---|---|
| 4,693,515 A | * | 9/1987 | Russo et al. |
| 4,830,434 A | | 5/1989 | Ishida et al. |
| 5,011,225 A | * | 4/1991 | Nemoto |
| 5,026,120 A | | 6/1991 | Takeda et al. |
| 5,052,754 A | | 10/1991 | Chinomi |
| 5,222,784 A | | 6/1993 | Hamelin |
| 6,062,644 A | | 5/2000 | Lance |

FOREIGN PATENT DOCUMENTS

WO    A1-9745290    12/1997

* cited by examiner

Primary Examiner—Milton Nelson, Jr.
(74) Attorney, Agent, or Firm—Birch, Stewart, Kolasch & Birch, LLP (57) ABSTRACT

An adjustable headrest for a seat backrest having a mounting system includes a frame structure adapted to be secured on the mounting system for up and down movement relative to the seat backrest. The headrest also includes a drive mechanism having a height adjustment drive system for controlling height adjustment of the headrest by moving a height adjuster section, and a fore/aft adjustment drive system for controlling fore/aft adjustment by moving the fore/aft adjuster section. The fore/aft drive system has an adjustment member constrained to up and down movement, and the adjustment member is engaged with the adjuster section so as to permit for/aft movement of the adjuster section relative to the adjuster section and the adjustment member.

26 Claims, 5 Drawing Sheets

ADJUSTABLE HEADREST

This application is a Continuation of PCT International Application No. PCT/AU99/00624 filed on Jul. 30, 1999, which designated the United States and on which priority is claimed under 35 U.S.C. §120, the entire contents of which are hereby incorporated by reference.

This invention relates to a headrest of the kind which is movable relative to the backrest of a seat on which it is mounted.

BACKGROUND AND PRIOR ART

With headrests of the above kind, movement usually varies the elevation of the headrest relative to the backrest, but it is also known to have a facility for fore and aft adjustment of the headrest position. It will be convenient to hereinafter describe the invention by reference to an adjustable headrest mounted on a vehicle seat, but it is to be understood that the invention has wider application and can by applied to seats of all kinds.

It is known to provide vehicle seats with headrests which are capable of adjustment so that the elevation of the headrest is varied. It is also known to provide headrests with a fore and aft adjustment facility. In some cases headrests are arranged to be adjustable both in relation to elevation and fore and aft disposition. Furthermore, it is known to provide such headrests with drive systems through which adjustment of the headrest position is effected.

In U.S. Pat. No. 4,830,434, a drive system is used for adjusting the headrest elevation, but not the fore the aft position. In the arrangements disclosed by U.S. Pat. Nos. 5,052,754 and 5,222,784, a drive system is provided for both types of adjustment. The drive system disclosed by each of the three U.S. patents is relatively complicated.

Vehicle manufacturers typically offer customers a choice of options concerning seating arrangements, including headrest adjustment. Options relating to the headrest may include manual adjustment, power adjustment, two-way adjustment (fore and aft, or up and down), four-way adjustment (both fore and aft, and up and down) and position memory. Given the varying requirements of those options it is generally not possible to offer all options without substantial variation in cost. By way of example, different options may require different seat backrest constructions or different headrest mounting systems.

SUMMARY OF THE INVENTION

The present invention seeks to provide a headrest which is capable of four-way adjustment and which is amendable to relatively simple construction. At least in preferred forms, the invention seeks to utilise a modular system such that principal components of the headrest can be utilised in a headrest capable of two-way (height only) adjustment.

An adjustable headrest according to one aspect of the invention includes a frame structure which can be secured on a mounting system for up and down movement relative to an associated seat backrest, and which includes a height adjuster section and a fore/aft adjuster section. The height adjuster section is secured on the mounting system for relative up and down movement of the frame structure. The fore/aft adjuster section is engaged with the height adjuster section for relative movement providing fore/aft adjustment. The headrest has drive means which includes two drive systems which control height adjustment and fore/aft adjustment respectively. The fore/aft drive system includes an adjustment member which is constrained substantially to up and down movement and which is engaged with the fore/aft adjuster section so as to permit fore/aft movement of the fore/aft adjuster section relative to the height adjuster section and the adjustment nut.

Thus, according to the invention, there is provided an adjustable headrest, for a seat backrest having an associated mounting system, wherein the headrest includes a frame structure adapted to be secured on the mounting system for up and down movement relative to the seat backrest, the frame structure including a height adjuster section and a fore/aft adjuster section; the fore/aft adjuster section is engaged with the height adjuster section for relative movement providing fore/aft adjustment; wherein the headrest further includes drive means which has a height adjustment drive system for controlling height adjustment of the headrest by moving the height adjuster section and fore/aft adjustment drive system for controlling fore/aft adjustment of the headrest by moving the fore/aft adjuster section; and wherein the fore/aft drive system has an adjustment member or nut which is constrained substantially to up and down movement and which is engaged with the fore/aft adjuster section so as to permit fore/aft movement of the fore/aft adjuster section relative to the height adjuster section and the adjustment nut.

The fore/aft adjuster section may be engaged with the height adjuster section by first engagement means which precludes relative movement therebetween in a direction for height adjustment, but which enables relative movement therebetween in a direction for fore/aft adjustment. The first engagement means may comprise at least one projection, rib or fin on one of the sections which is located in a slot which is defined by the other section and which extends in the fore/aft direction. The adjustment member or nut may be engaged with the fore/aft adjuster section by engagement means which constrains relative movement therebetween to movement along a direction which is inclined with respect to directions for both height and fore/aft adjustment to provide thereby fore/aft adjustment due to relative movement between the height and fore/aft adjuster sections being precluded in a direction for height adjustment. The second engagement means may be similar to the first engagement, but with the or each slot extending in the inclined direction. In each of the engagement means, the or each slot may be a groove, channel or the like, or a spacing between projections, ribs or fins defined by the component having the or each slot.

In one arrangement, the height adjuster of the frame structure is engaged with the fore/aft adjuster by having at least one projecting portion, such as a tab or the like, which engages in or with an elongate slot or track which is defined by the fore/aft adjuster and which extends in the fore/aft direction, i.e. in the direction required for the fore/aft adjustment. Similarly the adjustment nut is engaged with the fore/aft adjuster by having at least one projecting portion, such as a tab or the like, which engages in or with an elongate slot or track defined by the fore/aft adjuster and which extends in the fore/aft direction but is inclined at an angle to the slot or track engaged by the height adjuster. For engagement of one or each of the height adjuster and the adjustment nut with the fore/aft adjuster, a complementary method of this engagement can be used, but this can tend to limit the extent of fore/aft movement or provide a less compact arrangement. Thus, the height adjuster may define at least one track or slot in or with which a projecting portion of the fore/aft adjuster engages, while the adjustment nut may define at least one track or slot in or with which a projecting portion of the fore/aft adjuster engages.

In one embodiment, the drive system for fore/aft adjustment is an electrically powered drive means operable to raise and lower the adjustment nut, that is, to move it in the direction for height adjustment, relative to the height adjuster of the frame structure. Preferably the drive means includes an electric motor and a rotatable screw-threaded spindle drivingly connected to the motor, such as through a worm drive. The motor and spindle may be secured on the height adjuster, with the spindle co-operatively engaging a screw-threaded bore defined by or secured to the adjustment nut. The spindle is disposed in the direction of height adjustment such that, with rotation of the spindle by the drive motor, the adjustment nut is caused to travel along the spindle. Because of the respective engagement between the fore/aft adjuster of the frame structure and each of the height adjuster and the adjustment nut, the travel of the adjustment nut causes the fore/aft adjuster to move in the fore/aft direction, relative to the height adjuster, to provide fore/aft adjustment of the headrest.

The drive system for height adjustment may be as disclosed in PCT/AU97/00325. Thus, the drive system may include an electrically powered drive means operable to raise and lower the height adjuster of the frame structure, and hence the headrest, relative to the mounting system. Preferably the drive means includes an electric motor and a rotatable screw-threaded spindle drivingly connected to the motor, such as through a worm drive. The motor and spindle may be secured on or in relation to one of the height adjuster and the mounting system, while the spindle may co-operatively engage a screw-threaded nut defined by or secured on or in relation to the other one of the height adjuster and the mounting system.

The arrangement for fore/aft adjustment for the headrest of the invention differs from known arrangements, in particular those known arrangements using a tilting or nodding action. The arrangement of the invention enables fore/aft adjustment which is more effective for a greater height range for users. Moreover, throughout that range, the headrest can be maintained in a constant orientation, as the fore/aft adjustment can be and most preferably is substantially linear. For this, the or each groove or track by which the height adjuster of the core structure engages the fore/aft adjuster most preferably is substantially linear, with the groove or track most preferably substantially perpendicular to the direction of height adjustment.

As indicated, the or each groove or track by which the adjustment member engages the fore/aft adjuster of the frame structure is inclined with respect to the or each groove or track by which the height adjuster engages the fore/aft adjuster. The inclination may be such that the grooves or tracks converge in the forward direction, such that as the adjustment nut is raised or lowered, the headrest is adjusted respectively in the forward or rearward direction. The angle at which the grooves or tracks converge may, for example, be from about 20° to 40°, and determines the magnitude of fore/aft adjustment per unit length variation in the height of the adjustment nut.

In one embodiment the headrest is adapted for use with a mounting system including a post, or each of two laterally spaced posts, secured to the seat backrest and projecting beyond the upper edge of the backrest. For ease of description, the more usual arrangement of two laterally spaced posts is assumed in the following. The headrest frame structure may be mounted on both of the posts for relative sliding movement thereon in the axial direction of the posts. A cross member may extend between and be secured to the upper end portion of each of the posts, in which case the drive system for controlling height adjustment of the headrest may extend between that cross member and the height adjuster of the frame structure.

A power headrest according to the invention can be provided with a memorised position facility, and/or with a rapid-drop facility. Also, at least one support post of a powered headrest can form or include part of the electrical circuit through which the or each drive system is controlled. Still further, the or each post can form part of two or more individual circuits including (for example), the elevation circuit control, an upper memorised position circuit, and a lower memorised position circuit and/or corresponding fore/aft position circuits.

It will be convenient to hereinafter describe the invention in greater detail by reference to the accompanying drawings which slow example embodiments of the invention. The particularity of those drawings and the related detailed description is not to be understood as superseding the broad description of the invention given in the preceding part of this specification.

BRIEF DESCRIPTION OF THE DRAWINGS

In the drawings, which illustrate preferred embodiments of the invention.

DETAILED DESCRIPTION

Figures 1, 4:
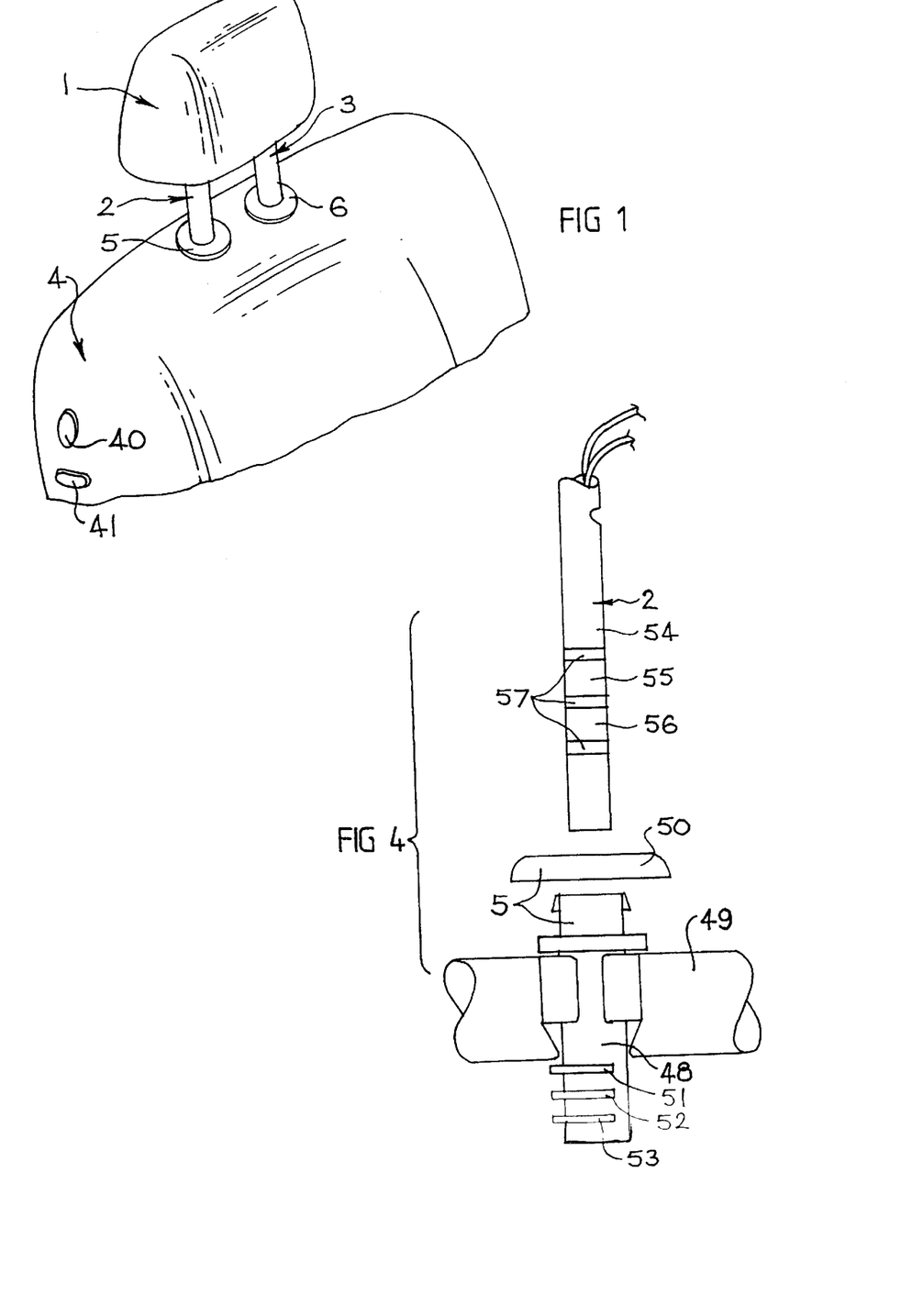
FIG. 1 is a perspective representation of a vehicle seat headrest arrangement.
FIG. 4 is a diagrammatic illustration of a power driven arrangement, involving a memory facility, for a headrest according to the invention.

FIG. 1 shows a typical vehicle seat headrest arrangement to which the present invention is applicable. The arrangement has a headrest 1 which is mounted on two laterally spaced support posts 2 and 3, each of which is attached to the seat backrest 4. The posts 2 and 3 are located in respective tubular guides 5 and 6 which are attached to the backrest 4 in a known manner. It is preferred that the posts 2 and 3 are removable from the backrest 2 for a reason hereinafter made clear, and it is further preferred that the headrest 1 and the posts 2 and 3 combine to form a headrest sub-assembly in which the headrest 1 is mounted on the posts 2 and 3 for relative movement so as to permit the required adjustment of the headrest elevation. In such an arrangement the posts 2 and 3 are normally held against movement relative to the guides 5 and 6 when the sub-assembly is mounted on the seat backrest 4.

In a preferred embodiment of the invention the headrest 1 includes a relatively rigid housing over which is applied suitable padding and trim material. The padding and trim material may be applied to the housing in any suitable manner, including that described in the specification of PCT patent application AU97/00325.

Figure 2:
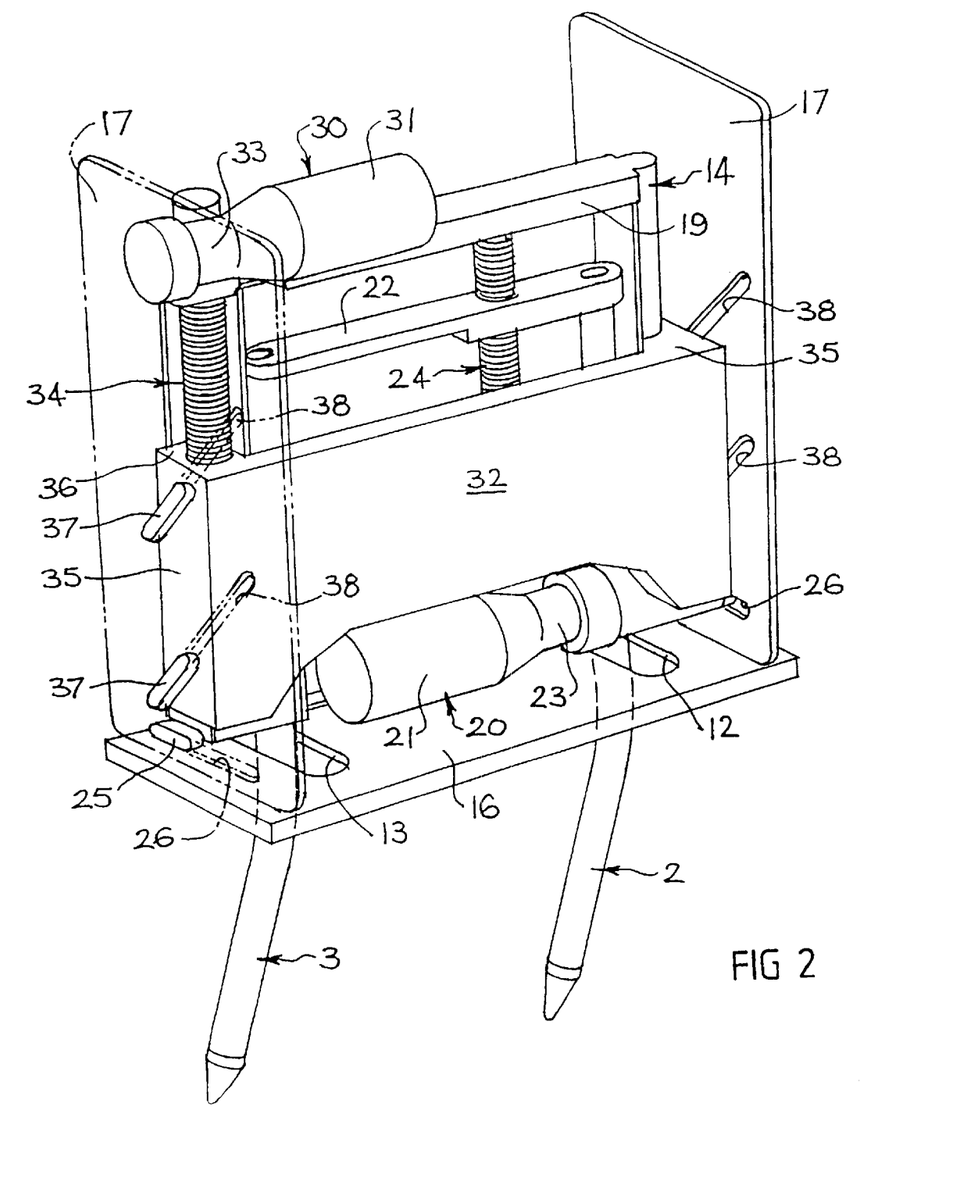
FIG. 2 is a rear perspective view of internal structure of a seat headrest according to a first embodiment of the invention, showing the headrest in one condition.
Figure 3:
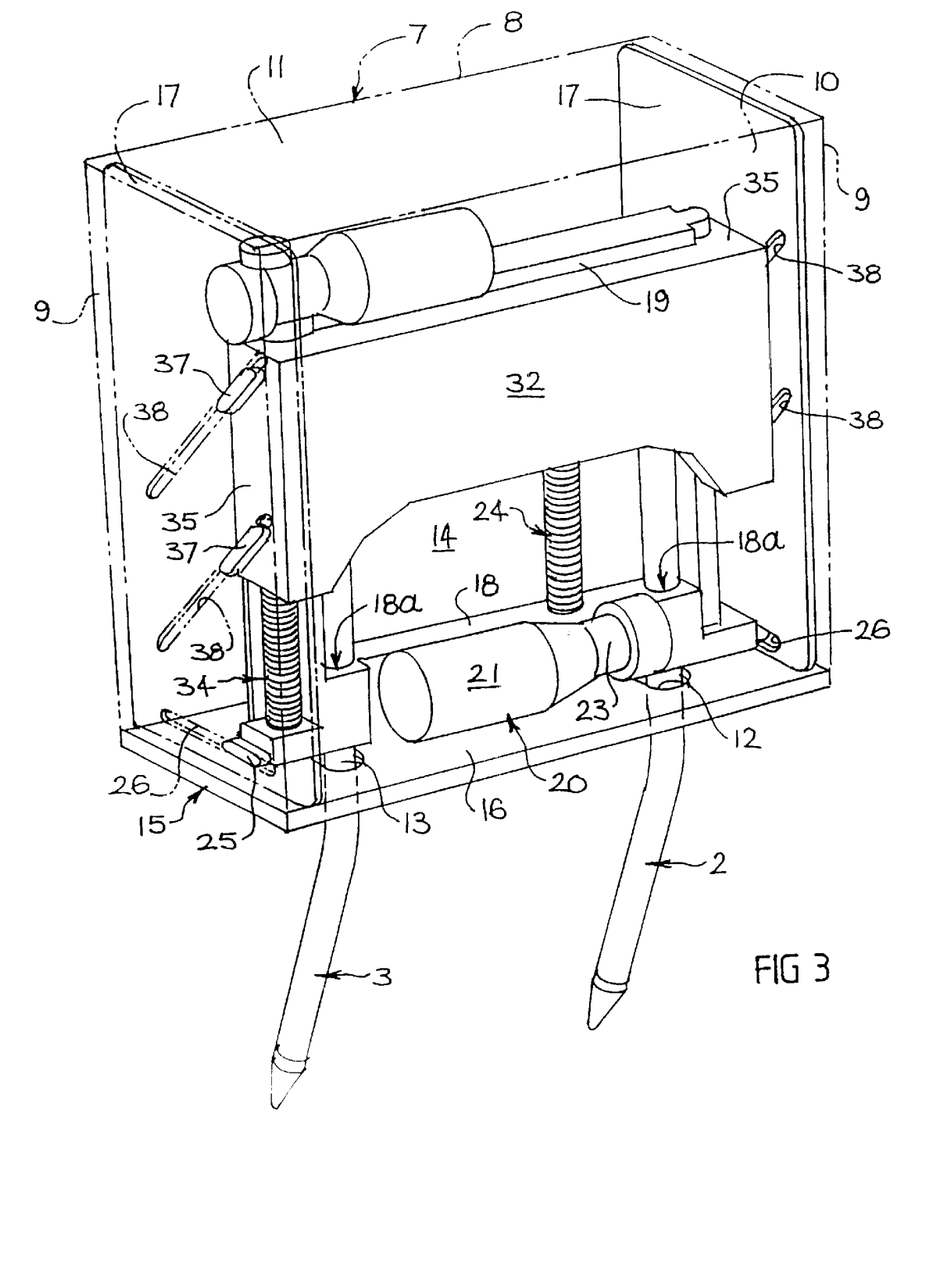
FIG. 3 is similar to FIG. 2, but shows the headrest in another condition.

FIGS. 2 and 3 are similar semi-diagrammatic rear perspective views of one embodiment of the invention. The housing 7 is shown in broken outline in FIG. 3, but is omitted from FIG. 2. The housing 7 is of relatively simple box-like form, and has a front wall 8, laterally spaced side walls 9, a rear wall 10 and a top wall 11. However housing 7 does not have a basal wall and it therefore opens downwardly within a lower perimeter defined by walls 8, 9 and 10.

A frame structure within housing 7 includes a height adjuster section 14 and an fore/aft adjuster section 15. The section 14 has the overall form of a rectangular plate which is disposed in a vertical plane so as to extend across each of posts 2 and 3. The section 15 has a basal wall portion 16 on which the lower perimeter of housing 7 is able to rest and, projecting upwardly from each lateral end of portion 16, a respective side wall portion 17. Section 15 is somewhat U-shaped, with inner section 14 disposed therein above portion 16 and between portions 17. The basal wall portion 16 has slots 12 and 13 through each of which a respective one of posts 2 and 3 projects, with slots 12 and 13 extending in the direction for fore/aft adjustment.

Each of the lower and upper edge of height adjuster section 14 is thickened to provide respective elongate basal and top ledge 18 and 19. Each of posts 2 and 3 projects through a respective opening 18a in basal ledge 18 so that section 14 is slidable on posts 2 and 3. Also, mounted on basal ledge 18, between posts 2 and 3, there is a drive mechanism 20. Mechanism 20 includes a motor 21 drivably connected to a cross bar 22 which is attached to the upper end of each of posts 2 and 3. The drive connection between the motor 21 and the cross bar 22 can be of any suitable form but, in the arrangement shown, includes a worm drive 23 connected to an upright screw-threaded spindle 24. While the upper end of spindle 24 is journalled in top ledge 19, spindle 24 extends through and is in screw-threaded engagement with cross bar 22. Thus, bar 22 functions as or defines a nut which, due to its attachment to posts 2 and 3, is held against rotation with spindle 24 but which moves up and down relative to the basal ledge 18 in response to rotation of the spindle 24. Of course, because of the attachment of cross bar 22 to posts 2 and 3, such movement causes basal ledge 18, and hence height adjuster section 14, to be moved up and down relative to posts 2 and 3, between two extreme positions set by the spacing between basal and upper ledges 18 and 19.

At each outer end of basal ledge 18, height adjuster section 14 has a respective outwardly projecting tab 25. Each tab 25 locates in a fore/aft extending slot 26 in the respective adjacent wall portion 17 of fore/aft adjuster section 15. Thus, inner and outer sections 14 and 15 of the frame structure are engaged with each other in a manner enabling relative movement between sections 14 and 15 in the fore/aft directions, but substantially precluding their relative vertical movement. Accordingly, with up and down movement of section 14 between its extreme positions, due to rotation of spindle 24, section 15 moves up and down with section 14. As a result, with sections 14 and 15 received in housing 7, headrest 1 is adjustable up and down relative to posts 2 and 3 with rotation of spindle 24.

Mounted on top ledge 19 of height adjuster section 14, there is a drive mechanism 30. Mechanism 30 includes a drive motor 31 drivably connected to an adjustment member or nut 32 which is engaged with fore/aft adjuster section 15. The drive connection between motor 31 and the adjustment member 32 can be of any suitable form but, in the arrangement shown, includes a worm drive 33 connected to the upper end of an upright, screw-threaded spindle 34. The lower end of spindle 34 is journalled in basal ledge 18. Also, spindle 34 extends through and is in screw-threaded engagement with adjustment member 32. Engagement of member 32 with fore/aft adjuster section 15 holds member 32 against rotation with spindle 34 and, due to this, member 52 defines or functions as a nut which moves up and down relative to sections 14 and 15 in response to rotation of spindle 34.

Adjustment member 32 has an overall rectangular form and is disposed parallel to height adjuster section 14. Member 32 may be of a skeletal structure, to minimise material usage and weight. At each of its lateral ends, member 32 is thickened to define a respective pronounced side wall 35. One of walls 35 defines a guide block 36 through which spindle 34 extends in screw-threaded engagement. The other one of walls 35, that is the one remote from spindle 34, defines a groove 35a in which a complementary tongue 14a at the same end of section 14 is received to thereby facilitate up and down relative movement between members 14 and 32. Also, each of walls 35 is engaged with a respective side wall portion 17 of fore/aft adjuster section 15 and it is by this means that member 32 is held against rotation with spindle 34.

The manner in which adjustment member 32 is engaged with section 15 is similar to the engagement between sections 14 and 15. However, each side wall 35 of member 32 has two vertically spaced tabs 37 each engaged in a respective slot 28 in the adjacent wall portion 17 of section 15. Also, in each wall portion 17, the slots 38 are inclined towards the respective slot 26. In the arrangement shown, the inclination is such that slots 38 converge with the respective slot 26 in the forward direction, although the opposite of this is possible.

With rotation of spindle 34 in a direction causing adjustment member 32 to move up relative to frame structure sections 14 and 15, each tab 37 is urged against the upper longitudinal side of its slot 38. This generates a lifting force in fore/aft adjuster section 15. However, outer section 15 is held against upward adjustment relative to height adjuster section 14, by engagement of each tab 25 in its slot 26. Also, unless spindle 24 also is rotating, the inertia of drive mechanism 20 acts to hold section 14, and hence section 15, against the lifting force acting against the upper side of each slot 38. The lifting force therefore is resolved into respective force components acting parallel and normal to the upper side of each slot 38, with the parallel component giving rise to a reaction force which acts to push fore/aft adjuster section 15 relative to height adjuster section 14, in the direction in which slots 38 converge with the respective slot 26, i.e. forwardly in the illustrated arrangement. Similarly, with rotation of spindle 34 in the opposite direction, causing member 32 to move down relative to frame structure sections 14 and 15, fore/aft adjuster section 15 is pushed oppositely to the slot convergence, i.e. rearwardly in the arrangement shown.

With relative movement of sections 14 and 15 resulting from rotation of spindle 34, housing 7 moves with section 15. Thus fore/aft adjustment of headrest 1 is able to be achieved. However, whereas height adjustment of headrest 1 is by movement of the frame structure and housing 7, as well as padding and trim on housing 7, as a unit relative to posts 2 and 3 cross bar 22, fore/aft adjustment is by internal adjustment resulting from relative movement between sections 14 and 15.

Each of motors 21 and 31 is reversible to permit the necessary two-way adjustment of each of the drive system mechanisms 20 and 30. Operation of the motors 21 and 31 may be controlled by switches 40 and 41, each located on the headrest 1 as shown by FIG. 1 or located remote from the headrest 1 if desired.

At least one of the posts 2 and 3 may form part of the electrical circuit as described in the specification of patent application PCT/AU97/00325. For four-way adjustment, the post 2 may form part of the circuit of one drive system (eg., elevation) and the post 3 may form part of the circuit of the other drive system (eg., fore and aft).

The electric power arrangement might also utilise a position memory facility involving the use of, for example, a pulse or sliding potentiometer. Once again, one or both of the posts 2 and 3 can form part of the relevant circuit.

FIG. 4 is a diagrammatic illustration of one aspect of a power driven arrangement involving a memory facility in which the support post 2 (or post 3 or each of posts 2 and 3) forms part of the electrical circuit. In the example shown by FIG. 4 the post guide 5 includes a tubular body part 48 which is attached to a frame member 49 of the seat backrest 4, and an annular cap part 50 which provides a trim in the assembled condition of the guide 5. Three electrical contacts 51, 52, 53 are attached to the body part 48, and they may form contacts for the power drive circuit, the lower memorised location circuit, and the upper memorised location circuit, respectively. The post 2 has corresponding contact sections 54, 55 and 56 provided at locations such that each will engage with an inner exposed part of the contacts 51, 52 and 53, respectively. An appropriate insulator 57 may be provided between each two adjacent sections 54, 55 and 56. Electrically conductive wires connected to the contact sections 54, 55 and 56 may extend through the interior of the post 2, if it is tubular, to connection with the relevant drive system contained within the headrest 1.

A similar array of contacts may be provided on the support post 3 of the associated guide 6 for control of the fore and aft drive system.

It is also possible to include a quick drop facility, particularly for at least one of the rear set headrests, so that a vehicle driver can quickly remove obstruction to vision caused by that headrest when the vehicle is reversing. The quick drop facility may include an appropriate switch conveniently positioned for operation by the vehicle driver which, when operated, causes the relevant headrest (or headrests) to be lowered. Alternatively, there may be a switch or alternative arrangement which causes the relevant headrest (or headrests) to be lowered in response to engagement of reverse gear. The lowering operation can be achieve through the drive system used to effect normal arrangement of the elevation of the headrest. Such an arrangement may also include provision for the vehicle driver to raise the lowered headrest (or headrests), while it also may utilise a memory facility to achieve a particular degree of elevation.

Figure 5:
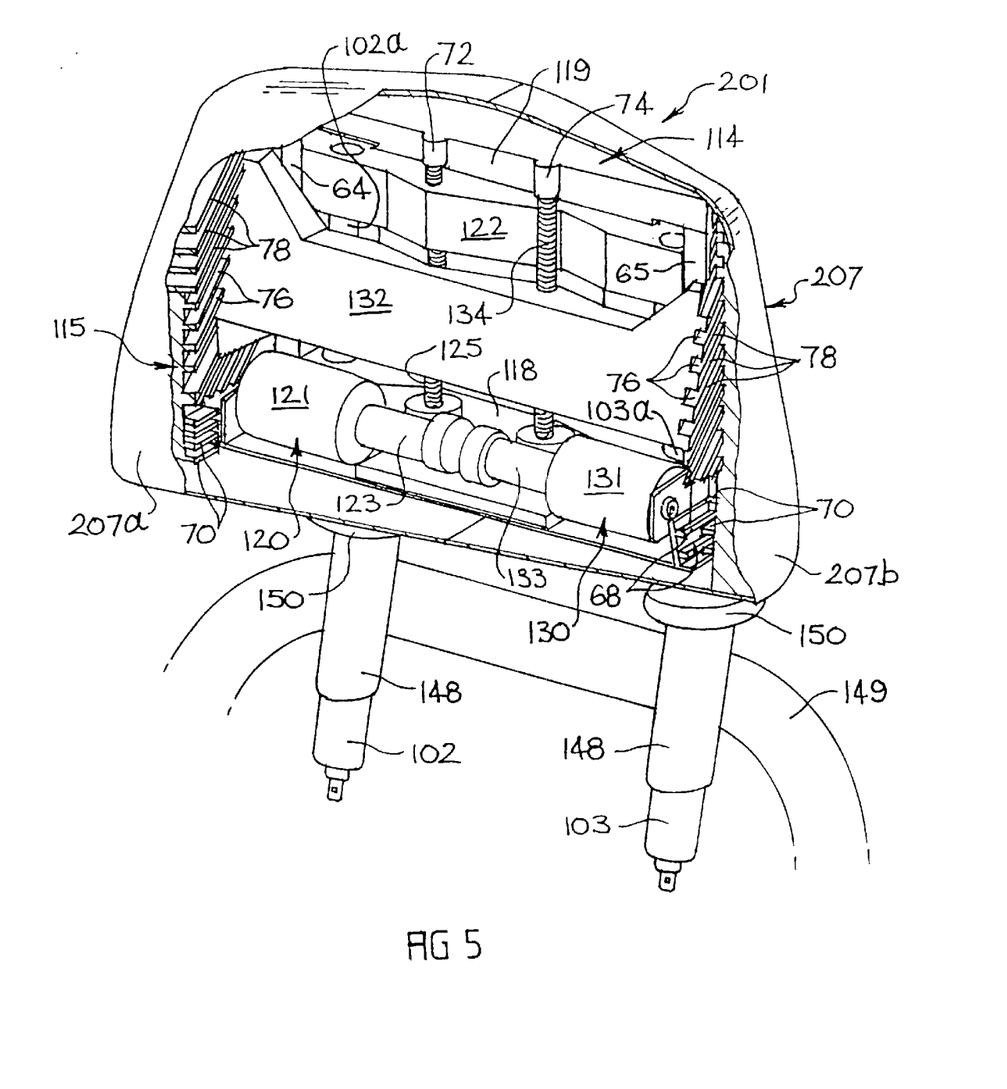
FIG. 5 is a front perspective view of internal structure of a seat headrest according to a second embodiment of the invention, showing the headrest in one condition.
Figure 6:
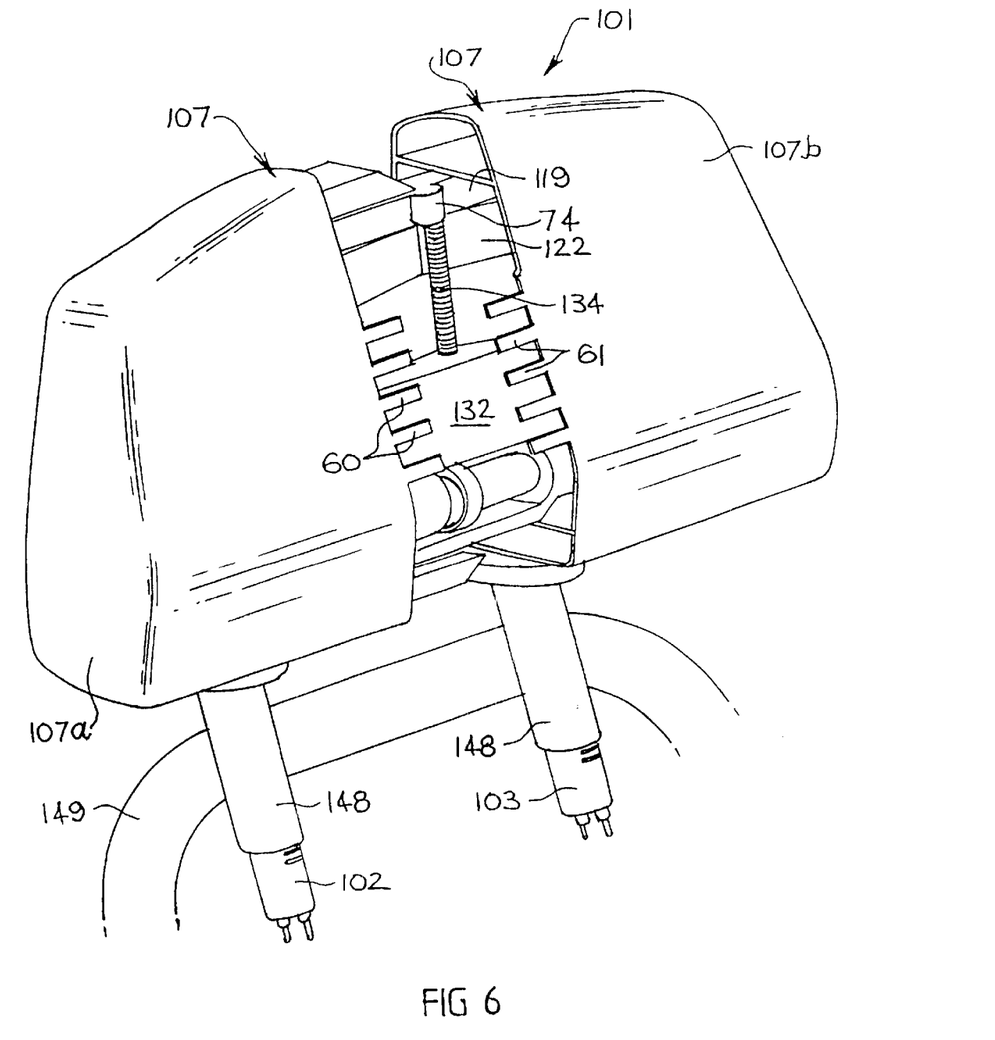
FIG. 6 is similar to FIG. 5, but shows the headrest in an other condition.

With reference to FIGS. 5 and 6, components of the headrest 101 shown therein which correspond to those of FIGS. 1 and 2 have the same reference numeral, plus 100.

The headrest 101 has a housing 107 which, as described later herein, forms part of the functioning internal arrangement. However, for the present, it is sufficient to note that housing 107 split on a medial plane through the headrest 101 and this comprises two complementary, hollow half-portions 107a and 107b. In FIG. 5, the portions 107a and 107b are shown as enclosing the internal arrangement, although the front face of housing 107 is shown broken away to enable that arrangement to be illustrated. As shown in FIG. 6, the portions 107a and 107b are separable, by each sliding laterally on other components of the internal arrangement. As also shown in FIG. 6, each portion 107a and 107b has respective laterally extending fingers 60 and 61 and, with housing 107 closed as in FIG. 5, fingers 60 and 61 interfit and extend across the front of the other one of portions 107a and 107b. If required, the interfitting fingers can provide a snap-fit securing portions 107a and 107b together. However, suitable padding and trim material, when provided around housing 107, additionally or alternatively are able to maintain portions 107a and 107b in their closed positions.

Headrest 101 includes a height adjuster section 114 and a fore/aft adjuster section 115. The section 115 includes portions 107a and 107b of housing 107, and their subsequently referred to ribs 70 and ribs 78. The section 114 is in the form of a rectangular frame. Section 114 has a horizontally disposed, transverse basal rail 118 and top rail 119, and vertical side posts 64 and 65. The portions 107a and 107b of housing 107 are slidable on rails 118 and 119 of section 114 during their movement between the closed position shown in FIG. 5 to a position at or beyond that shown in FIG. 6.

The outer face of each of the posts 64 and 65, adjacent to its junction with basal rail 118, carries a vertically spaced series of ribs 68 which extend in the fore/aft direction. Also, at an inner face opposed to ribs 68, each housing portion 107a and 107b has a similar series of ribs 70 which are staggered with respect to ribs 68. The arrangement is such that, with housing 107 closed by its portions 107a and 107b being in the abutting positions shown in FIG. 5, the ribs 70 interfit with the ribs 68. Thus, the housing 107 and height adjuster section 114 are positively locked against relative vertical movement.

Each posts 102 and 103 is insertable into a respective tubular fitting 148 of a seat backrest frame 149, via an annular cap 150. The posts 102 and 103 have upper portions 102a and 103a which extend though basal openings in housing portions 107a and 107b, respectively. Within housing 107, the portions 102a and 103a are laterally spaced between posts 64 and 65 of adjuster section 114, but with each of portions 102a and 103a adjacent to a respective one of posts 64 and 65.

Mounted on adjuster section 114, there is a drive mechanism 120. Mechanism 120 includes a motor 121 drivably connected to a cross-bar 122 while the cross-bar 122 is attached to an upper end of each of post portions 102a and 103a. In the arrangement shown, the drive connection between motor 121 and cross-bar 122 includes a worm drive 123 connected to an upright screw-threaded spindle 125. The upper end of the spindle 125 is journalled in a boss 72 of the top rail 119, while the spindle 125 extends through and is in screw-threaded engagement with cross-bar 122. Thus, cross-bar 122 functions as or defines a nut in the same manner and to achieve a similar result as bar 22 in the arrangement of FIGS. 2 and 3. That is, section 114 is able to be moved up and down relative to posts 102 and 103, between extreme positions set by the spacing between rails 118 and 119 and the width of cross-bar 122 in the direction of that movement. Also, due to interfitting ribs 68 and 70, housing 107 is movable with section 114.

Mounted on basal rail 118 of height adjuster section 114, there is a drive mechanism 130. Mechanism 130 includes a drive motor 131 drivably connected to an adjustment member or nut 132 which is engaged with fore/aft adjuster section 115. The drive connection between motor 131 and the adjustment member 132 can be of any suitable form but, in the arrangement shown, includes a worm drive 133 connected to the lower end of an upright, screw-threaded spindle 134. The upper end of spindle 134 is journalled in a boss 74 provided on upper rail 119. Also, spindle 134 extends through and is in screw-threaded engagement with adjustment member 132. Engagement of member 132 with fore/aft adjuster section 115 holds member 132 against rotation with spindle 134 and, due to this, member 132 defines or functions as a nut which moves up and down relative to sections 114 and 115 in response to rotation of spindle 134.

Adjustment member 132 has an overall rectangular form and is disposed parallel to height adjuster section 114. At each of its lateral ends, member 132 is engaged with a respective one of housing portions 107a and 107b and it is by this means that member 132 is held against rotation with spindle 134.

The manner in which adjustment member 132 is engaged with housing portions 107a and 107b is similar to the engagement between section 14 and housing 107. Each side defines a respective, vertically spaced series of grooves 76 which are inclined upwardly and rearwardly in the fore/aft directions. Also, the inner face of each of housing portions 107a and 107b on which ribs 70 are provided also has a vertically spaced series of ribs 78 which are inclined upwardly and rearwardly parallel to grooves 76. The ribs 78 are complementary to grooves 76 and such that, with housing 107 closed by its portions 107a and 107b being in the abutting positions shown in FIG. 5, each rib 78 of each series locates in a respective groove 76.

With rotation of spindle 134 in a direction causing adjustment member 132 to move up relative to frame structure sections 114 and 115, each rib 78 is urged against the lower longitudinal side of its groove 76. This generates a lifting force in fore/aft adjuster section 115. However, section 115 is held against upward adjustment relative to height adjuster section 114, by engagement of the ribs 68 of each series with the ribs 70 of a respective series. Also, unless spindle 125 also is rotating, the inertia of drive mechanism 120 acts to hold section 114, and hence section 115, against the lifting force acting against the lower side of each groove 76. The lifting force therefore is resolved into respective force components acting parallel and normal to the lower side of each groove 76, with the parallel component giving rise to a reaction force which acts to push fore/aft adjuster section 115 relative to height adjuster section 114, in the direction in which grooves 76 converge with the ribs 68 and 70, i.e. forwardly in the illustrated arrangement. Similarly, with rotation of spindle 134 in the opposite direction, causing member 132 to move down relative to frame structure sections 114 and 115, fore/aft adjuster section 115 is pushed in the opposite direction, i.e. rearwardly in the arrangement shown.

With relative movement of sections 114 and 115 resulting from rotation of spindle 134, housing 107 moves with section 115. Thus fore/aft headrest adjustment is able to be achieved. However, whereas height adjustment of the headrest is by movement of the frame structure and the housing, as well as padding and trim on the housing, as a unit relative to posts 2 and 3 and cross bar 122, fore/aft adjustment is by internal adjustment resulting from relative movement between sections 114 and 115.

Each of motors 121 and 131 is reversible to permit the necessary two-way adjustment of each of the drive system mechanisms 120 and 130. Operation of the motors 121 and 131 may be controlled by switches located as shown by FIG. 1 or located remote from the headrest.

With the embodiment of FIGS. 5 and 6, the disposition of components maximises efficient space utilisation. This is enhanced by the front face of cross-bar 122 and the rear face of nut 132 being of complementary forms such that, seen in plan view, those faces have a chevron form. Due to this form, spindle 125 and spindle 134 is able to extend through a part of cross-bar 122 and nut 132, respectively, which is of larger thickness; while portions 102a and 103a of posts 102 and 103 also extend through and are secured in parts of cross-bar 122 which are of larger thickness. Also, in having each of cross-bar 122 and nut 132 engaging with a respective inner face of each of housing portions 107a and 107b, motors 121 and 131 are able to be disposed with their output shafts extending laterally in end to end alignment.

At least in embodiments similar to those illustrated, the drive spindle controlling fore and aft displacement is in a vertical orientation. This minimises the potential danger offered to front or rear seat passengers in the event of the passenger impacting against the front or rear of the headrest due to a collision.

It will be apparent from the foregoing that the present invention provides a headrest system which is to be of relatively simple construction, despite providing four-way adjustment. As a consequence, the headrest is able to be relatively inexpensive. In the latter regard, it will be appreciated that some components providing height adjustment in a four-way adjustable headrest also can be of a form enabling their alternative use in a headrest providing only height adjustment, such that development costs can be shared between at least two products of a range. The seat backrest and the headrest mounting system can include the means to enable adoption of any one of a variety of adjustment systems, and it is only necessary to change the headrest sub-assembly (ie., the headrest and the support posts) to adopt a different adjustment system. In particular, there can be a selection between headrest sub-assemblies having and not having, respectively, a position memory facility.

As will be appreciated from the illustrated embodiments, in particular the embodiment of FIGS. 5 and 6, the headrest of the invention is amenable to manufacture in a compact form. Also, components are able to be made to tolerances providing for their neat interfitting and, where relevant, for smooth sliding relative movement. The headrest therefore is able to have substantially no free play between components. Even with the form of connection shown in FIG. 4 for the support posts, free play can be substantially avoided. This is in contrast to tilting of nodding forms of fore/aft adjustment in known headrests, as those known headrests can exhibit a level of free play or slackness in the fore/aft direction as can allow whiplash to occur in the event of a collision. This free play or slackness in the known headrests can be exacerbated by a lever-arm effect due to the vertical distance between the pivot axis and the level at which the head of a user contacts the headrest.

Finally, it is to be understood that various alterations, modifications and/or additions may be introduced into the constructions and arrangements of parts previously described without departing from the spirit or ambit of the invention.

What is claimed is:

1. An adjustable headrest, for a seat having a backrest and an associated mounting system, comprising:

a frame structure adapted to be secured on the mounting system for up and down movement relative to the seat backrest, the frame structure including a height adjuster section and a fore/aft adjuster section, the fore/aft adjuster section being engaged with the height adjuster section for relative movement providing fore/aft adjustment; and drive means which has a height adjustment drive system for controlling height adjustment of the headrest by moving the height adjuster section and a fore/aft adjustment drive system for controlling fore/aft adjustment of the headrest by moving the fore/aft adjuster section; wherein the fore/aft drive adjustment system has an adjustment member which is constrained substantially to up and down movement and which is engaged with the fore/aft adjuster section so as to permit fore/aft movement of the fore/aft adjuster section relative to the height adjuster section and the adjustment member, wherein the fore/aft adjuster section is engaged with the height adjuster section by first engagement means which precludes relative movement between said sections in a direction for height adjustment while enabling relative movement between said sections in a direction for fore/aft adjustment.

2. The headrest according to claim 1, wherein the first engagement means comprises at least one projection, rib or fin, on one of said sections, which is located in a slot extending in the fore/aft direction and defined by the other of said sections.

3. The headrest according to claim 1, wherein the adjustment member is engaged with the fore/aft adjuster section by second engagement means which constrains relative movement between said member and said section to movement along a direction which is inclined with respect to directions for both height and fore/aft adjustment to provide thereby fore/aft adjustment of the headrest due to the first engagement means precluding relative movement in the direction for height adjustment between the height and fore/aft adjuster sections.

4. The headrest according to claim 3, wherein the second engagement means comprises at least one projection, rib or fin, on said member and said fore/aft adjuster section, which is located in a slot extending in said inclined direction and defined by the other of said member and said fore/aft adjuster section.

5. The headrest according to claim 1, wherein the fore/aft adjustment drive system is a first electrically powered drive means operable to move the adjustment member relative to the height adjuster section, in the direction for height adjustment.

6. The headrest according to claim 5, wherein the first drive means is secured on the height adjuster section and includes a first electric motor and a first rotatable, screw-threaded spindle drivingly connected to the first motor, and the first spindle is cooperatively engaged in a screw-threaded bore defined by the adjustment member with the first spindle disposed in the direction for height adjustment, whereby travel of the adjustment member by rotation of the first spindle causes the fore/aft adjuster section to move in the fore/aft direction relative to the height adjuster section due to the respective engagement of the fore/aft adjuster section with the height adjuster section and the adjustment member.

7. The headrest according to claim 1, wherein the height adjustment drive system is a second electrically powered drive means operable to move the height adjuster section, and hence the headrest, in the direction for height adjustment.

8. The headrest according to claim 7, wherein the second drive means includes a second electric motor and a second rotatable screw-threaded spindle drivingly connected to the second motor, the second motor and the second spindle are secured on or in relation to one of the height adjuster section and the mounting system, and the second spindle is cooperatively engaged with a screw-threaded member secured on or in relation to the other one of the height adjuster section and the mounting system.

9. The headrest according to claim 7, wherein the second drive means includes a second electric motor and a second rotatable screw-threaded spindle drivingly connected to the second motor, the second motor and the second spindle are secured on or in relation to one of the height adjuster section and the mounting system, and the second spindle is cooperatively engaged with a screw-threaded member defined by the other one of the height adjuster section and the mounting system.

10. The headrest according to claim 9, wherein the member with which the second spindle is engaged is fixed in relation to post means which is adapted to be secured to the mounting system.

11. The headrest according to claim 1, wherein the height adjuster section and the fore/aft adjuster section are disposed within a housing which is split on a medial plane through the headrest to comprise two complementary hollow housing portions.

12. The headrest according to claim 11, wherein the housing portions are oppositely movable between a closed position for the housing, in which the portions abut, and respectively laterally retracted positions in which the portions are mutually spaced.

13. The headrest according to claim 12, wherein the housing portions provide part of the fore/aft adjuster section.

14. An adjustable headrest, for a seat having a backrest and an associated mounting system, comprising:

a frame structure adapted to be secured on the mounting system for up and down movement relative to the seat backrest, the frame structure including a height adjuster section and a fore/aft adjuster section, the fore/aft adjuster section being engaged with the height adjuster section for relative movement providing fore/aft adjustment; and drive means which has a height adjustment drive system for controlling height adjustment of the headrest by moving the height adjuster section and a fore/aft adjustment drive system for controlling fore/aft adjustment of the headrest by moving the fore/aft adjuster section; wherein the fore/aft drive adjustment system has a nut which is constrained substantially to up and down movement and which is engaged with the fore/aft adjuster section so as to permit fore/aft movement of the fore/aft adjuster section relative to the height adjuster section and the nut, wherein the fore/aft adjuster section is engaged with the height adjuster section by first engagement means which precludes relative movement between said sections in a direction for height adjustment while enabling relative movement between said sections in a direction for fore/aft adjustment.

15. The headrest according to claim 14, wherein the first engagement means comprises at least one projection, rib or fin, on one of said sections, which is located in a slot extending in the fore/aft direction and defined by the other of said sections.

16. The headrest according to claim 14, wherein the nut is engaged with the fore/aft adjuster section by second engagement means which constrains relative movement between said nut and said section to movement along a direction which is inclined with respect to directions for both height and fore/aft adjustment to provide thereby fore/aft adjustment of the headrest due to the first engagement means precluding relative movement in the direction for height adjustment between the height and fore/aft adjuster sections.

17. The headrest according to claim 16, wherein the second engagement means comprises at least one projection, rib or fin, on said nut and said fore/aft adjuster section, which is located in a slot extending in said inclined direction and defined by the other of said member and said fore/aft adjuster section.

18. The headrest according to claim 14, wherein the fore/aft adjustment drive system is a first electrically powered drive means operable to move the nut relative to the height adjuster section, in the direction for height adjustment.

19. The headrest according to claim 18, wherein the first drive means is secured on the height adjuster section and includes a first electric motor and a first rotatable, screw-threaded spindle drivingly connected to the first motor, and the first spindle is cooperatively engaged in a screw-threaded bore defined by the nut with the first spindle disposed in the direction for height adjustment, whereby travel of the nut by rotation of the first spindle causes the fore/aft adjuster section to move in the fore/aft direction relative to the height adjuster section due to the respective engagement of the fore/aft adjuster section with the height adjuster section and the nut.

20. The headrest according to claim 14, wherein the height adjustment drive system is a second electrically powered drive means operable to move the height adjuster section, and hence the headrest, in the direction for height adjustment.

21. The headrest according to claim 20, wherein the second drive means includes a second electric motor and a second rotatable screw-threaded spindle drivingly connected to the second motor, the second motor and the second spindle are secured on or in relation to one of the height adjuster section and the mounting system, and the second spindle is cooperatively engaged with a screw-threaded nut secured on or in relation to the other one of the height adjuster section and the mounting system.

22. The headrest according to claim 20, wherein the second drive means includes a second electric motor and a second rotatable screw-threaded spindle drivingly connected to the second motor, the second motor and the second spindle are secured on or in relation to one of the height adjuster section and the mounting system, and the second spindle is cooperatively engaged with a screw-threaded nut defined by the other end of the height adjuster section and the mounting system.

23. The headrest according to claim 22, wherein the nut with which the second spindle is engaged is fixed in relation to post means which is adapted to be secured to the mounting system.

24. The headrest according to claim 15, wherein the height adjuster section and the fore/aft adjuster section are disposed within a housing which is split on a medial plane through the headrest to comprise two complementary hollow housing portions.

25. The headrest according to claim 24, wherein the housing portions are oppositely movable between a closed position for the housing, in which the portions abut, and respectively laterally retracted positions in which the portions are mutually spaced.

26. The headrest according to claim 25, wherein the housing portions provide part of the fore/aft adjuster section.

* * * * *